US009508148B2

(12) United States Patent
Zhang et al.

(10) Patent No.: US 9,508,148 B2
(45) Date of Patent: Nov. 29, 2016

(54) VISION-GUIDED ALIGNMENT SYSTEM AND METHOD

(75) Inventors: Biao Zhang, West Hartford, CT (US); Jianjun Wang, West Hartford, CT (US); Gregory F. Rossano, Enfield, CT (US); Thomas A. Fuhlbrigge, Ellington, CT (US)

(73) Assignee: ABB Research Ltd., Zurich (CH)

( * ) Notice: Subject to any disclaimer, the term of this patent is extended or adjusted under 35 U.S.C. 154(b) by 352 days.

(21) Appl. No.: 13/817,833

(22) PCT Filed: Aug. 25, 2011

(86) PCT No.: PCT/US2011/049088
§ 371 (c)(1),
(2), (4) Date: Feb. 20, 2013

(87) PCT Pub. No.: WO2012/027541
PCT Pub. Date: Mar. 1, 2012

(65) Prior Publication Data
US 2013/0147944 A1    Jun. 13, 2013

Related U.S. Application Data

(60) Provisional application No. 61/377,566, filed on Aug. 27, 2010.

(51) Int. Cl.
*G06F 17/50* (2006.01)
*H04N 9/79* (2006.01)
(Continued)

(52) U.S. Cl.
CPC ............ *G06T 7/0018* (2013.01); *B25J 9/1661* (2013.01); *B25J 9/1687* (2013.01); *B25J 9/1692* (2013.01);
(Continued)

(58) Field of Classification Search
CPC ............ B25J 19/04; H04N 7/18; G06K 9/00
USPC ........................ 348/95; 318/568.16; 382/203
See application file for complete search history.

(56) References Cited

U.S. PATENT DOCUMENTS

| 4,833,383 A | 5/1989 | Skarr et al. ............... 318/568.16 |
| 5,193,599 A | 3/1993 | Plaatsman ..................... 157/1.55 |

(Continued)

FOREIGN PATENT DOCUMENTS

| CN | 1243690 A | 9/2000 | ............ A61B 17/00 |
| DE | 199 30 087 A1 | 1/2001 | ............... B25J 9/18 |
| DE | 199 30 087 A1 | 1/2001 | ............... B25J 9/18 |

OTHER PUBLICATIONS

International Search Report mailed Dec. 12, 2011 in corresponding application No. PCT/US2011/049088.
(Continued)

*Primary Examiner* — Sath V Perungavoor
*Assistant Examiner* — Patricia I Young
(74) *Attorney, Agent, or Firm* — Taft Stettinius & Hollister LLP (57) ABSTRACT

A vision-guided alignment system to align a plurality of components includes a robotic gripper configured to move one component relative to another component and a camera coupled to a processor that generates an image of the components. A simulated robotic work cell generated by the processor calculates initial calibration positions that define the movement of the robotic gripper such that position errors between the actual position of the robotic gripper and the calibration positions are compensated by a camera space manipulation based control algorithm executed by the processor to control the robotic gripper to move one component into alignment with another component based on the image of the components.

14 Claims, 4 Drawing Sheets

(51) Int. Cl.
   *B25J 19/04*   (2006.01)
   *G06K 9/00*    (2006.01)
   *G06T 7/00*    (2006.01)
   *B25J 9/16*    (2006.01)

(52) U.S. Cl.
   CPC .... *B25J 9/1697* (2013.01); *G05B 2219/35059* (2013.01); *G05B 2219/39391* (2013.01); *G05B 2219/40032* (2013.01); *G05B 2219/40616* (2013.01); *G05B 2219/45029* (2013.01); *Y10S 901/02* (2013.01); *Y10S 901/47* (2013.01)

(56) References Cited

U.S. PATENT DOCUMENTS 6,304,050 B1    10/2001  Skaar et al. ............ 318/568.11
6,748,112 B1 *   6/2004  Nguyen et al. ............... 382/203

OTHER PUBLICATIONS

*An Extendable Framework for Expectation-based Visual Servoing Using Environment Models*; Nelson et al.; Proceedings of the IEEE International Conference on Robotics and Automation; May 21, 1995; pp. 184-189.
*Feature-based Visual Servoing and Its Application to Telerobotics*; Hager et al.; Intelligent Robots and Systems '94; Advanced Robotic Systems and the Real World; IROS 94; Proceedings of the IEE; International Conference; Munich, Germany: Sep. 12-16, 1994; vol. 1, Sep. 12, 1994.
Written Opinion mailed Dec. 2011 in corresponding application No. PCT/US2011/049088.
International Preliminary Report on Patentability mailed Mar. 5, 2013 in corresponding application No. PCT/US2011/049088.
Office Action mailed Sep. 3, 2014 in corresponding application No. 201180041489.1 (Chinese language).
Office Action mailed Sep. 2014 in corresponding application No. 201180041489.1 (English language translation).

* cited by examiner

VISION-GUIDED ALIGNMENT SYSTEM AND METHOD

TECHNICAL FIELD

Generally, the present invention relates to a vision-guided alignment system. More specifically, the present invention relates to a vision-guided alignment system that utilizes a camera space manipulation control process. Particularly, the present invention relates to a vision-guided alignment system that is controlled using a camera space manipulation control process that is automatically initialized.

BACKGROUND ART

Robotic automation processes that require two or more components to be aligned relative to each other, such as pick and place operations, material removal, and the assembly of electronic devices including portable, palm-size electronic devices, such as mobile communication devices, GPS (Global Positioning System) navigation devices, and PDAs (personal data assistants) is predominantly a repetitive manual task. In particular, with regard to pick and place operations and material removal, the robotic process carrying out such operations is required to move various structural components with high precision to successfully complete the operation. Whereas, the difficulty in automating electronic device assembly is due to the unique characteristics of the small-scale or small-sized electronic components involved, which are typically in the range of 1 to 10 mm, and which must be assembled together with tight spatial tolerances. Thus, the successful automated assembly of electronic devices requires that the structural features provided by each small-scale component, such as a connection socket on a printed circuit board (PCB), be precisely aligned to allow their successful assembly.

In order to achieve precision alignment of structural components, as well as tight-tolerance, automated assembly of small-scale electronic components, vision-guided robotic alignment and assembly techniques, such as model calibration techniques and visual servoing techniques, have been utilized to compensate for position and orientation variation errors inherent in the operation of automated robotic alignment and assembly systems. Model calibration techniques rely on obtaining an accurate camera model calibration and generating an accurate robot kinematic model to achieve precise component positioning during automated robotic alignment and assembly, which is expensive, complex, and time-consuming. Visual servoing, on the other hand, requires high-speed image processing to robustly detect image error between the robot's current pose and a target robot pose at all times in order to adjust the motion of the robot so that it can close in or otherwise be adjusted toward the target pose. Unfortunately, the high-speed image processing utilized by visual servoing is complex and costly to deploy and maintain.

Due to the drawbacks of the model calibration and visual servoing techniques, camera space manipulation (CSM) control techniques were developed. Camera space manipulation uses one or more imaging cameras to image a component as it is being manipulated or otherwise moved by a robot to generate a simple local camera space model that maps the relationship between the nominal position coordinates of the robot and the appearance of structural features found on the component, such as an electrical component, that is being manipulated in camera image space. For example, the camera space model may model the appearance of structural features on a component, such as a connection socket on a printed circuit board (PCB) that is being grasped by a robotic gripper. Camera space manipulation requires only a limited number of local data points to be acquired during the positioning process to refine the local camera model in order to compensate for grasping error, robot forward kinematic error and camera model error, so as to achieve precise, tight-tolerance assembly of small-scale components, as well as precision alignment during pick and place and material removal operations for example.

However, to implement vision-guided alignment or assembly using camera space manipulation techniques, a manual setup or initialization is initially required so that the local camera space model recognizes the visual structural features provided by the component being manipulated by the robot. To complete the manual training, the visual structural features of the component, which are visually accessible to the camera, are selected by an individual on an ad-hoc basis, based on their experience. Once the features are identified, the component is brought within the field of view of the camera so that it is imaged as an image frame. In addition, the individual must manually define the center of the visual feature in the camera space field of view, while the relative position between each visual feature in robot physical space is also required to be defined. Moreover, manual initialization requires that the relative position between the visual features, which are visually accessible to the camera, and assembly features, which are outside the field of view of the camera, of the component in the image frame also be defined. However, because assembly features of the component are not visually accessible by the imaging camera, it is difficult to accurately measure the distances between visual features and assembly features manually. Unfortunately, the error resulting from the manual measurement results in an inaccurate robot camera model that is generated based on the position of the visual features. This robot camera model is used to control the robot so as to position the component so that the visually occluded assembly features are placed in the correction position. Thus, if the robot camera model is inaccurate, the robot is unable to align or assemble the components accurately with high precision, which is unwanted.

Moreover, identifying the insertion positions that identify the location of structural features where the components are to be coupled or assembled together by manually jogging or moving the robot is very difficult and requires numerous trials by a skilled robotic engineer. The initial calibration information for identifying the position of the robot and visual feature appearance data that is captured in visual camera space, is used to initialize the robot camera calibration model and is dependent on the skill of the robotic engineer who is required to establish the visibility of the visual features of the components throughout each calibration position of the camera. Unfortunately, using a manual initialization process it is difficult to ensure the reachability of the robot, ensure that the robot is able to avoid collisions with surrounding structures in the robotic cell, and to ensure that the same orientation exists between the calibration positions and the insertion positions, since each robot position may have different positioning errors caused by an imperfect robot forward kinematic model. Moreover, the manual initialization process makes it difficult to ensure the calibration positions are distributed in both camera image space and robot physical space in order to obtain desired levels of stability and sensitivity to sample noise from the camera space manipulation (CSM) control process initialization calculation, which is desired.

In addition, manual testing of the initial calibration positions is tedious, time consuming, and error prone, as this process typically requires multiple iterations of manually moving the robot in order to develop acceptable calibration positions.

Therefore, there is a need for a vision-guided alignment system that automatically initializes and configures a camera space manipulation model to compensate for position and orientation variations errors, where the visual features of the components to be assembled are automatically identified using associated CAD (computer aided design) component models. In addition, there is a need for a vision-guided alignment system that automatically initializes and configures a camera space manipulation model to automatically define the relative position between visually accessible features and the visually occluded assembly features of the components being assembled. Furthermore, there is a need for a vision-guided alignment system that automatically generates calibration positions in a computer-simulated robotic work cell to acquire data to calculate the initial camera robot calibration model, which is tested and verified in the computer-simulated robotic work cell.

SUMMARY OF INVENTION

In light of the foregoing, it is a first aspect of the present invention to provide a vision-guided alignment system and method.

It is another aspect of the present invention to provide a vision-guided alignment system to align a plurality of components comprising a robotic gripper configured to have one component relative to another component, and a camera coupled to a processor, said camera generating an image of the components, wherein a simulated robotic work cell generated by said processor calculates initial calibration positions that define the movement of said robotic gripper, such that position errors between the actual position of the robotic gripper and said calibration positions are compensated by a camera space manipulation based control algorithm executed by said processor, to control said robotic gripper to move one component into alignment with another component based on said image of the components.

It is yet another aspect of the present invention to provide a method of aligning a plurality of components comprising providing camera and a robotic gripper each controlled by a processor, the robotic gripper configured to move a grasped component relative to a mounted component, identifying the relative position of at least one feature of the grasped component viewable by the camera with at least one feature of the grasped component not viewable by the camera from a model of the grasped component processed by the processor, generating calibration positions for the gripper in a work cell simulated at the processor that define the movement of the grasped component by the robotic gripper to the mounted component based on the model of the grasped component, moving the grasped component by the robotic gripper in accordance with the calibration positions, monitoring the movement of the grasped component relative to the mounted component by the camera, and joining the at least one feature of the grasped component to at least one feature of the mounted component.

BRIEF DESCRIPTION OF THE DRAWINGS

These and other features and advantages of the present invention will become better understood with regard to the following description and accompanying drawings wherein.

DETAILED DESCRIPTION OF THE INVENTION

Figure 1:
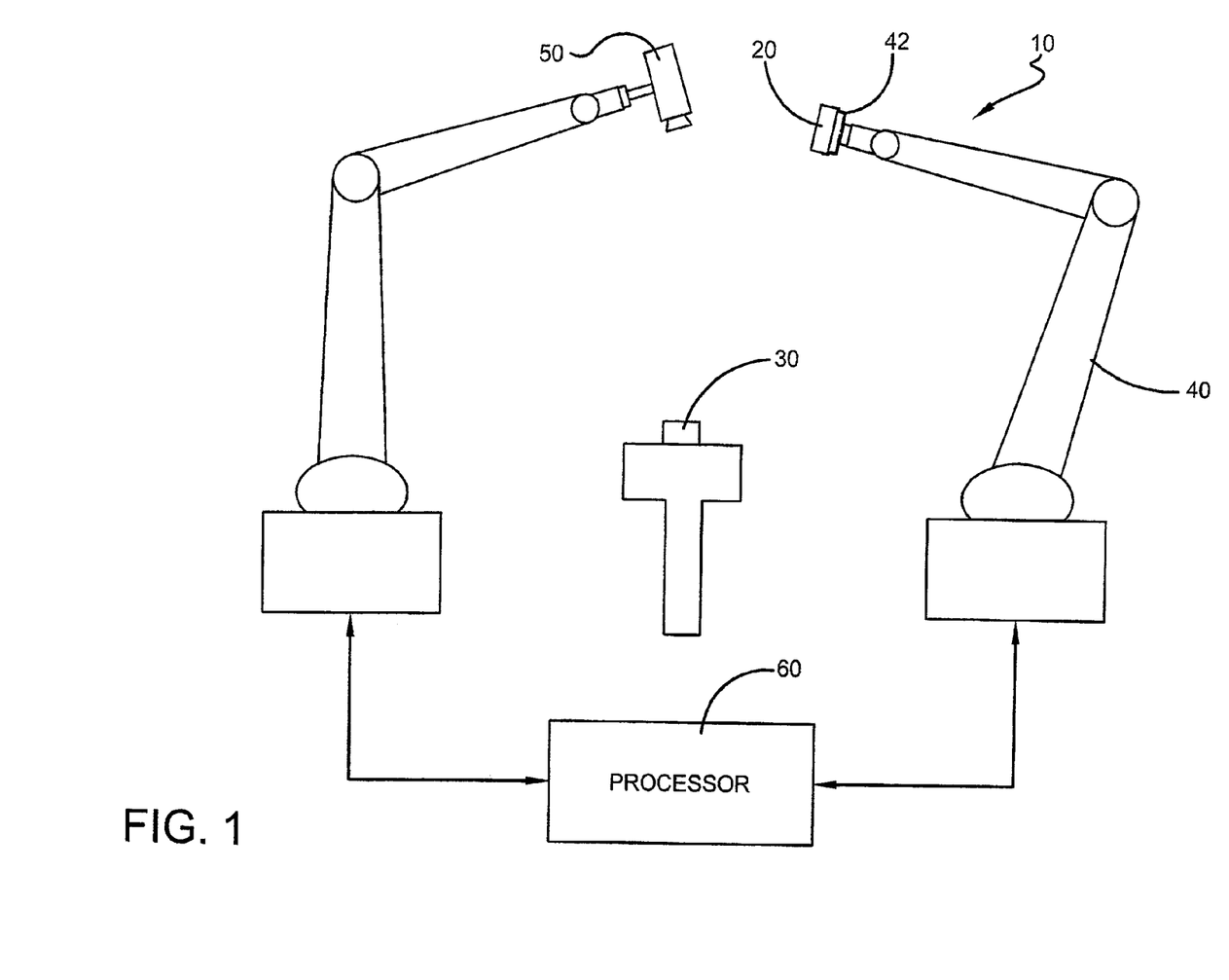
FIG. 1 is a schematic view of a vision-guided alignment system showing a robotic gripper moving a grasped component relative to a mounted component within the field of view of an imaging camera in accordance with the concepts of the present invention.
Figure 2:
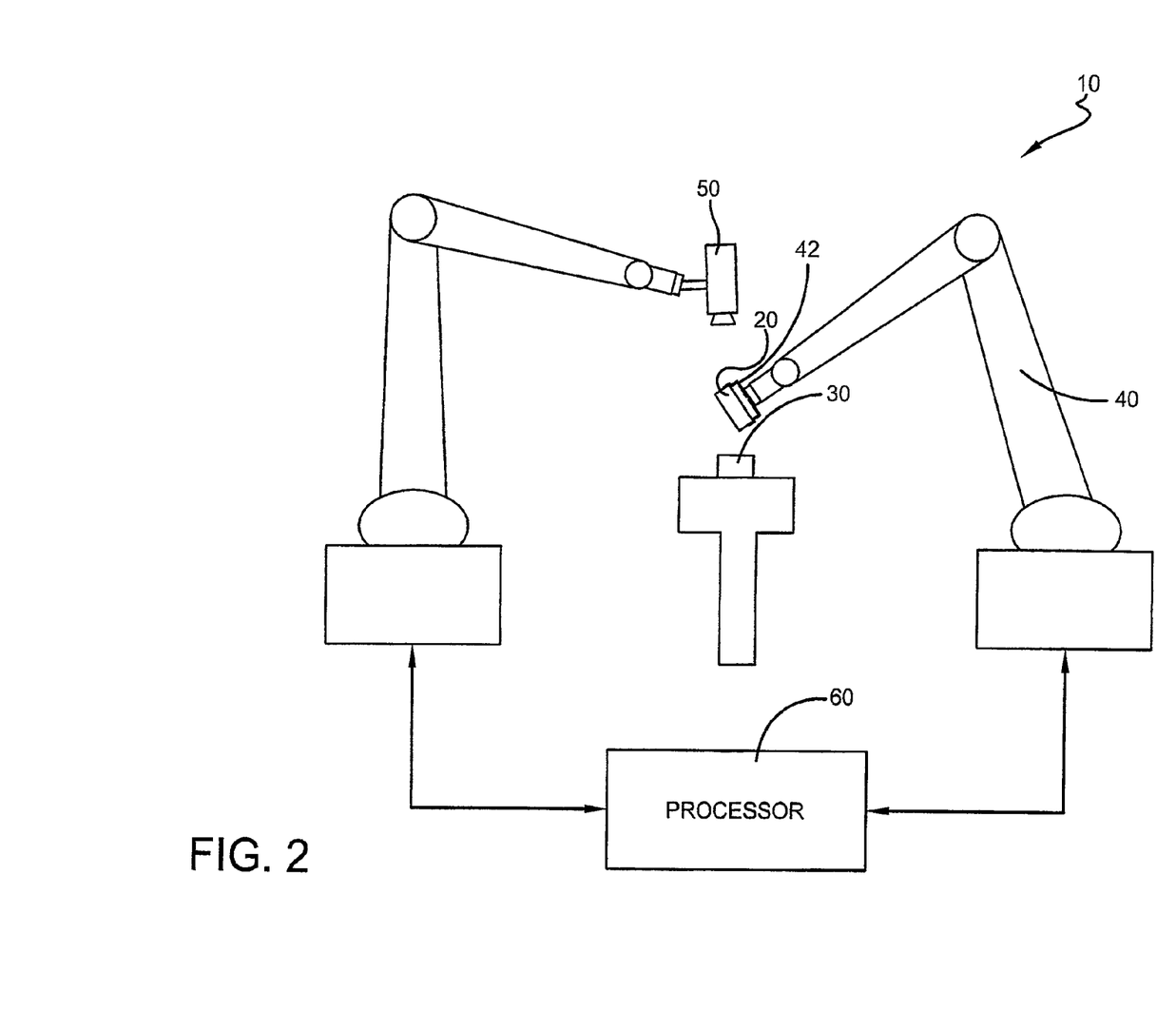
FIG. 2 is a schematic view of the vision-guided alignment system showing the robotic gripper aligning the assembly features of the grasped and mounted components in accordance with the concepts of the present invention.

A system and method for automatically initializing a camera space manipulation (CSM) control process algorithm for a vision-guided alignment system 10 used to achieve precision alignment and/or tight-tolerance assembly of structures, such as small-scale components for electronic devices, is shown in the Figs. Specifically, with reference to FIG. 1, to align and/or couple a structural feature of a grasped electronic component 20 with a structural feature that is on a mounted electronic component 30, the vision-guided robotic assembly system 10 utilizes a robot 40 having an end effector comprising a robotic gripper 42. The gripper 42 is guided using one or more cameras 50 coupled to a processor 60, which serves as a vision recognition system that is configured to visually identify structural features on the components 20,30. The camera 50 is oriented so that its field of view (FOV) encompasses the robotic gripper 42 and the grasped and mounted components 20,30. For example, the camera 50 is held in a fixed or movable position using any suitable means, such as by another robot, and is oriented so that the field of view of the camera 50 encompasses that of the robotic gripper 42 and the components 20,30, as shown in FIG. 2. It should be appreciated that the camera 50 may comprise any suitable resolution for imaging the components 20,30 while the processor 60 may comprise the necessary hardware and/or software, including the necessary input and output devices, such as a display and keyboard, for carrying out the functions to be discussed. Indeed, the processor 60 is able to move the robotic gripper 42 and camera 50 to any desired position and is configured to fully control the operation of the robot 40 and camera 50. Moreover, the processor 60 can receive user input to facilitate operation of the robot 40, the robotic gripper 42, and the camera 50. Furthermore, it should be appreciated that the components 20 and 30 may comprise any component or structure, including electronic components such as small-scale electronic components, for example. During operation of the system 10, the camera space manipulation control process refines a local camera robot model that compensates for grasping error, robot forward kinematic error, and camera model error that results from the operation of the vision-guided alignment system 10 and is automatically initialized in a manner to be discussed, so as to achieve precise, tight-tolerance assembly of the components 20,30.

While the discussion presented herein describes the use of the vision-guided alignment system and method 10 to align and assemble small-scale electronic components based on their visual features 132,142, such should not be construed as limiting. As such, it should be appreciated that the vision-guided alignment system and method 10 described herein can be utilized to align structures, such as tools and work objects, necessary to perform pick and place operations, to carry out material removal or to perform or build-up operations, or to complete any other automated task requiring the alignment of two or more structures based on the appearance of visual features of the structures.

Figure 3A:
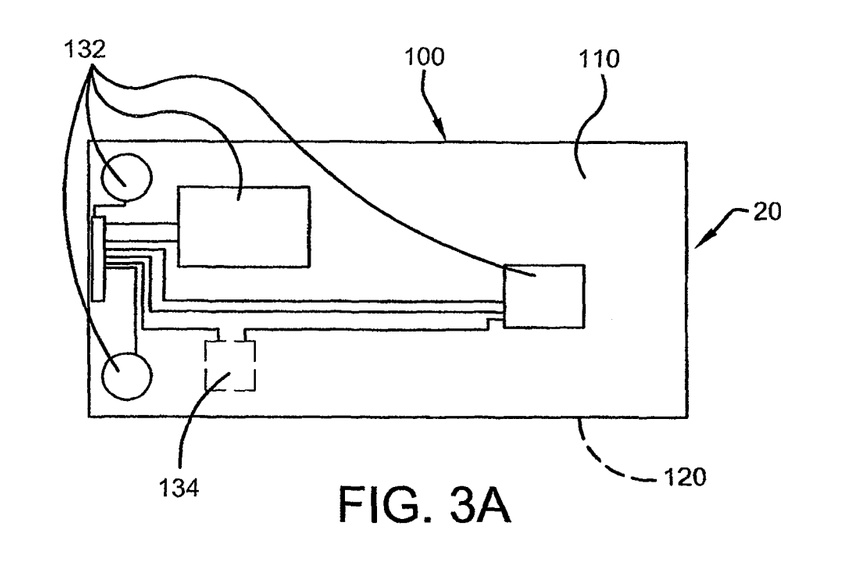
FIG. 3A is a top plan view of the grasped component having visually accessible visual features and visually occluded assembly features in accordance with the concepts of the present invention.
Figure 3B:
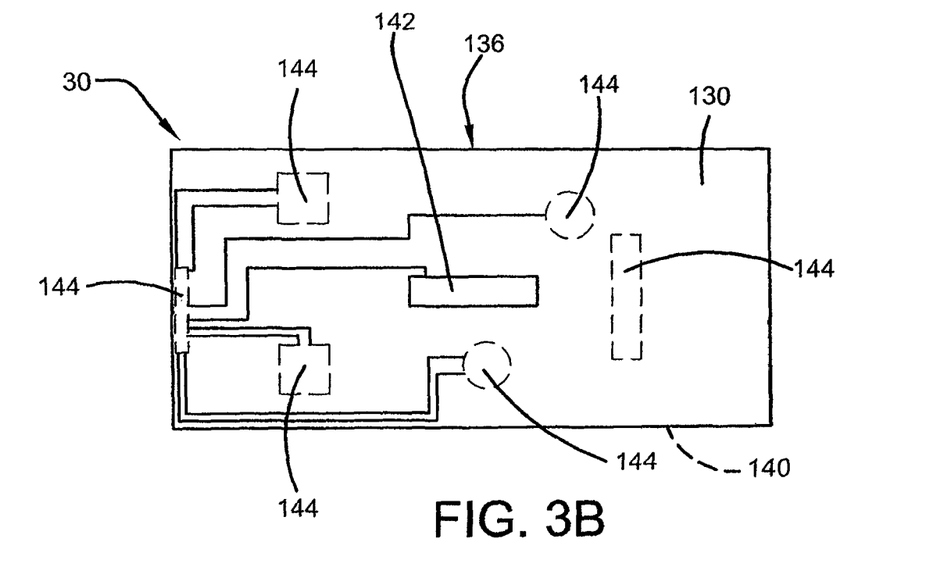
FIG. 3B is a top plan view of the mounted component having visually accessible visual features and visually occluded assembly features in accordance with the concepts of the present invention.

Continuing to FIG. 3A, the grasped component 20 comprises a substrate 100, such as a printed circuit board having opposed top and bottom sides 110 and 120. The top side 110 provides visual features 132 that are visually accessible to the camera 50, while the bottom side 120 provides an assembly feature 134 that is visually occluded from the field of view of the camera 50. Because of the orientation of the top and bottom sides 110,120 of the component 20 when grasped by the robotic gripper 42, assembly features 134 on the bottom side 120 of the grasped component 20 are occluded or blocked from the field of view (FOV) of the camera 50. This prevents the system 10 from being able to accurately align the grasped component 20 with the mounted component 30 using data obtained from the image of the grasped component 20 captured by the camera 50. Correspondingly, FIG. 3B shows the mounted component 30, which comprises a substrate 136 having opposed top and bottom sides 130 and 140. As such, the top side 130 provides visual features 142 visually accessible to the camera 50, while the bottom side 30 provides an assembly feature 144 that is visually occluded from the field of view of the camera 50. It should be appreciated that the grasped component 20 and mounted component 30 may have any number of visual and assembly features 132,134,142,144, and that the visual features 132,134 and assembly features 142,144 may comprise any suitable structural component, such as a connection socket or connector that are configured to be coupled or mated together, for example.

In order to align the occluded assembly feature 134 located on the bottom side 120 of the grasped component 20 with the visual feature 142 of the mounted component 30, the computer aided design (CAD) layout model or component model associated with the components 20,30 is loaded into the processor 60 and used by the system 10 to establish a relationship between the visual features 132 of the grasped component 20 that are visually accessible by the camera 50 with the assembly features 134 that are visually occluded from the field of view of the camera 50. That is, the CAD component model electronically represents the components 20,30, such as it defines the location and arrangement of all their structural features 132,134,142,144, so as to identify the relative spatial position between the visual features 132,142 that are visually accessible to the camera 50 and the assembly features 134,144 that are visually occluded from the camera 50. As such, the camera space manipulation control method utilized by the alignment system 10 allows the robotic gripper 42 to precisely align any one of the occluded assembly features 134 of the grasped component 20 with the appropriate mating or receiving visual feature 142 of the mounted component 30 at the defined insertion position by using camera images of the visual feature 132 and the CAD component model of the grasped component 20.

Figure 4:
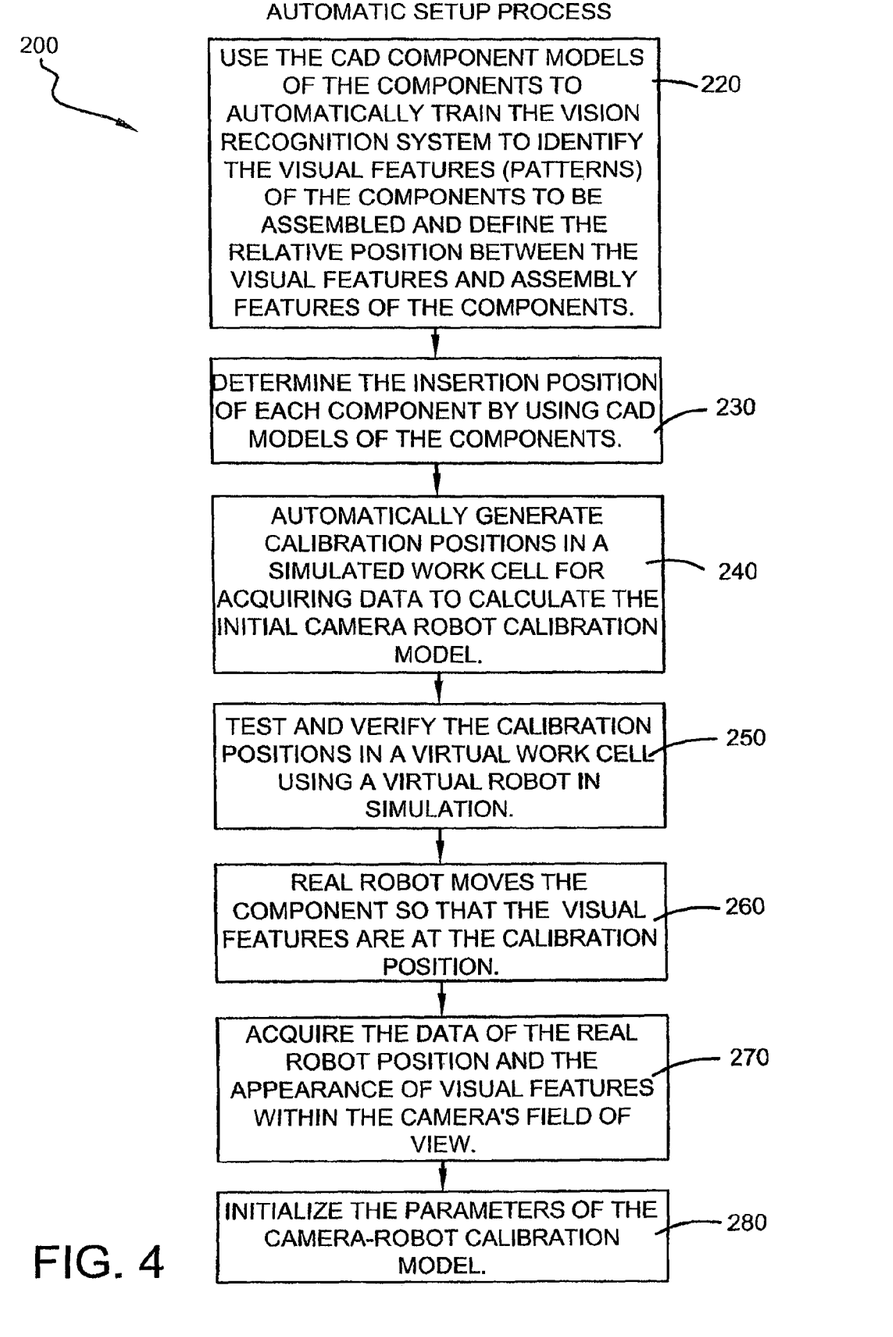
FIG. 4 is a flow diagram showing the operational steps for automatically setting up or initializing a camera space manipulation control process used to control the vision-guided alignment system in accordance with the concepts of the present invention.

Thus, with the details of the vision-guided alignment system 10 set forth, the following discussion will present the operational steps in which the camera space manipulation (CSM) control process used to control the alignment system 10 is set up or initialized, which are generally referred to by numeral 200, as shown in FIG. 4 of the drawings. Initially, at step 220, the precise relative position of the visual features 132,142 and assembly features 134,144 are extracted by the processor 60 from the CAD component model associated with the components 20,30. It should be appreciated that the CAD component models can be transferred to the processor 60 using any suitable means of data transfer, including wired or wireless data transfer, for example. The shape and dimension of the visual features 132,142 are extracted from the CAD component model and then utilized to train the vision recognition system comprising the camera 50 and processor 60 to visually identify the visual pattern associated with the visual features 132,142 of the components 20,30. The center of the visual feature 132 is automatically recognized by the processor 60 from the image captured by the camera 50, allowing the robotic gripper 42 to automatically move the gripped component 20 so that the physical position of the visual features 132 in physical space matches the image captured by the camera 50. This automated initialization process 200 is user-friendly, allowing simplified setup, while reducing human error that would otherwise be introduced into the system 10.

In another aspect, the process 200 may be configured to operate as a semi-automatic system, whereby the pattern recognition of the components 20,30 may be automatically trained first, while allowing the end user to tune or adjust the parameters in the pattern, using the input devices provided by the processor 60.

Next, at step 230 the insertion position, which defines the pair of visual features 132,142 and/or assembly features 134,144 that are to be coupled or mated together to complete the assembly of the components 20,30, is identified by the processor 60 by using the CAD component models associated with the components 20,30. It should also be appreciated that the user can select the visual features 132,142 and assembly features 134,144 of the components 20,30 from the CAD component models and the specific manner for aligning and/or assembling the components 20,30.

At step 240, a computer-simulated robotic work cell generated by the processor 60, which fully or partially represents a real or potential robotic work cell automatically generates initial robot calibration positions used to calculate the initial camera robot calibration model that is associated with the positions of the robotic gripper 42. It should be appreciated that although step 240 describes the automatic generation of the initial robot calibration positions, such positions may be manually specified directly in the computer-simulated robotic work cell. For example, the initial robot calibration positions may be generated or specified by a user by manually jogging the simulated robot and recording the positions through which the robot has been moved. In one aspect, the initial calibration positions may be generated using the roughly-specified or estimated position of the mounted component 30 to define a center point of a sphere having a specified radius. Candidate calibrations positions lying on the sphere are then filtered and selected based on the following constraints, including, but not limited to: a nominal robot forward kinematic model; the position and orientation of the camera 50 and operating parameters of the vision recognition system (camera 50 and processor 60); the roughly-specified or estimated position of the components 20,30; the CAD component models associated with the components 20,30; the estimated position of the gripper 42; and the optimized path that is taken by the robot 40 to move the grasped component 20 into alignment with the mounted component 30. Specifically, the position and orientation of the camera 50 and the operating parameters of the vision recognition system (camera 50 and processor 60) defines the constraints of the initial calibration positions, which ensure that the vision-guided alignment system 10 can view the appearance of visual features 132 on the grasped component 20 gripped by the gripper 42. In addition, the nominal robot forward kinematic model, the CAD component model of the components 20,30, and the position of the robotic gripper 42 defines the constraints of the initial calibration positions, which ensures that the robot 40 is able to physically reach the initial calibration positions during its operation. The roughly-specified or estimated position of the components 20,30 defines the constraints of the initial calibration positions to ensure that no collision occurs between the robot 40 and any other objects in the robotic work cell as the robot 40 moves during the assembly of the components 20,30. The optimized path that is taken by the robot 40 to move the grasped component 20 into alignment with the mounted component 30 ensures that the orientation of the initial calibration positions are the same as the physical orientation of the robot 40 for the final alignment and assembly of the components 20,30 at the insertion position. However, because the nominal robot forward kinematic model is imperfect, the position of the robot 40 may differ from the initial calibration positions, thus creating positioning errors. However, since the automatically generated calibration positions have the same orientation as the final alignment position that is taken by the robot 40 to assemble the components 20, 30, the positioning error is compensated by the resulting camera robot calibration model that is generated by the processor 60 from the initial robot calibration positions. The automatic generation of the initial calibrated positions also considers the numerical stability and noise sensitivity in using the initial calibration data to fit the camera robot calibration model and spread the calibration positions in both camera image space and robot physical space. That is, if the calibration positions are very close to each other either in image space or robot physical space, the matrix containing the initial data collected from these positions is close to an ill-conditioned matrix. However, the numerical stability problems resulting from the parameter fitting process, which would otherwise tend to make the camera robot calibration model sensitive to noise in the data is taken into account and minimized during the automatic initialization process 200 of the present invention.

Next at step 250, the automatically generated initial calibration positions are verified and tested in a computer-simulated or virtual robotic work cell generated by the processor 60 that fully or partially represents a real or potential robotic work cell using data that includes but is not limited to: a nominal robot forward kinematic model; the position and orientation of the camera 50 and operating parameters of the vision recognition system (camera 50 and processor 60); the roughly-specified or estimated position of the components 20,30; and the optimized path that is taken by the robot 40 to move the grasped component 20 into alignment with the mounted component 30.

After the calibration positions of the robotic gripper 42 have been tested and verified through computer simulation at step 250, the process continues to step 260, where the robotic gripper 42 moves the grasped component 20 through each robot calibration position established at step 240 within the field of view (FOV) of the camera 50. Continuing to step 270, the camera 50 acquires the position of the gripper 42 and monitors the appearance of the visual feature 132 at a plurality of positions as the gripper 42 moves through each calibration position. Finally, the process 200 continues to step 280, where the system 10 utilizes the acquired robotic gripper 42 position data and visual feature 132 appearance data to establish the initial camera-robot calibration model using any suitable data fitting method, such as the least squares method, the Levenberg-Marquardt method, the linear regression method, and the simplex method for example. That is, the initial camera-robot calibration model used by the camera space manipulation control process maps the spatial relationship between the nominal position coordinates of the robot 40 and the appearance of the visual features 132 identified by the camera 50 on the grasped component 20 being moved in the field of view of the camera 50. As such, the resultant automatically initialized camera-robot calibration model allows the system 10 to precisely assemble the components 20,30 together at the defined insertion position.

It will, therefore, be appreciated that one advantage of one or more embodiments of the present invention is that a vision-guided alignment system using camera space manipulation is initialized or setup by extracting training patterns of the components to be assembled from associated CAD component models without ad-hoc and error-prone manual training. Another advantage of the present invention is that the initialization or setup of the vision-guided alignment system is carried out by determining the insertion position of one component into the other component utilizing the CAD component models associated with the components, without the difficulty of manually jogging or moving the robot to teach the insertion position to the system. Yet another advantage of the present invention is that the vision-guided alignment system uses a computer-simulated work cell that automatically generates initial calibration positions based on the visibility of the visual features of the components at each calibration position for one or more cameras and based on the reachability of the robot. Still another advantage of the present invention is that a vision-guided alignment systems uses a computer-simulated work cell to ensure the avoidance of collisions of the robot with structures in the robotic cell, ensures the same orientation exists between the calibration positions and the insertion positions, even though each robot position may have different positioning errors caused by an imperfect robot forward kinematic model. Another advantage of the present invention is that a vision-guided alignment system uses a computer-simulated work cell to ensure that calibration positions are distributed in both the camera image space and the robot physical space, resulting in enhanced stability and reduced sensitivity to sample noise generated from the camera space manipulation (CSM) control process initialization calculation. Still another advantage of the present invention is that a vision guided alignment system tests calibration positions in a simulated work cell to verify the automatically generated calibration positions by testing all the important requirements without tedious and time consuming manual testing.

Although the present invention has been described in considerable detail with reference to certain embodiments, other embodiments are possible. Therefore, the spirit and scope of the appended claims should not be limited to the description of the embodiments contained herein.

What is claimed is:

1. A vision-guided alignment system to align a plurality of components comprising:
   a robotic gripper configured to move one component relative to another component;
   a camera coupled to a processor, said camera generating an image of the components; and
   a computer aided design (CAD) model of the components stored on a non-transitory computer readable medium readable by the processor;
   wherein a computer-simulated robotic work cell representing a real or potential robotic work cell is generated by said processor using said CAD model, said computer-simulated robotic work cell calculates initial calibration positions that define the movement of said robotic gripper, such that position errors between the actual position of the robotic gripper and said calibration positions are compensated by a camera space manipulation based control algorithm executed by said processor, to control said robotic gripper to move one component into alignment with another component based on said image of the components.

2. The vision-guided alignment system of claim 1, wherein said initial calibration positions are verified and tested in said computer-simulated robotic work cell.

3. The vision-guided alignment system of claim 1, wherein said robot gripper assembles the aligned components together at a predetermined insertion position identified by said processor using said CAD model associated with at least one of the components.

4. The vision-guided alignment system of claim 3, wherein said CAD model identifies the relationship between at least one feature viewable by said camera and at least one feature not viewable by said camera.

5. The vision-guided alignment system of claim 1, wherein said processor is configured to identify visual features from said image using said CAD model associated with at least one of the components.

6. The vision-guided alignment system of claim 1, wherein said camera has a field of view that encompasses the component grasped by said robotic gripper.

7. The vision-guided alignment system of claim 1, wherein said initial calibration positions are generated by said processor in accordance with a data fitting method selected from the group consisting of a least-squares method, a Levenberg-Marquardt method, a linear regression method, or a simplex method.

8. A method of aligning a plurality of components comprising:
   providing camera and a robotic gripper each controlled by a processor, said robotic gripper configured to move a grasped component relative to a mounted component, said grasped component comprising first and second opposing sides;
   transferring a computer aided design (CAD) model of the grasped component to the processor;
   identifying the relative position of at least one feature on said first side of said grasped component viewable by said camera with at least one feature on said second side of said grasped component not viewable by said camera from said CAD model of said grasped component processed by said processor;
   generating calibration positions from a camera space manipulation control algorithm for said gripper by a work cell simulated at said processor that define the movement of said grasped component by said robotic gripper to said mounted component based on said CAD model of said grasped component;
   moving said grasped component by said robotic gripper in accordance with said calibration positions;
   monitoring the movement of said grasped component relative to said mounted component by said camera; and
   joining said at least one said feature on said second side of said grasped component to at least one feature of said mounted component.

9. The method of claim 8, wherein said calibration positions generated at said generating step are constrained by one or more of the position of said camera, the position of one or more of said components, or the position of said robotic gripper.

10. The method of claim 8, further comprising verifying said calibration positions in said work cell after said generating step.

11. The method of claim 8, wherein said calibration positions are generated at said generating step in accordance with a data fitting method selected from the group consisting of a least-squares method, a Levenberg-Marquardt method, a linear regression method, or a simplex method.

12. The method of claim 8, further comprising identifying the position of said at least one feature of said mounted component by said CAD model of said mounted component processed by said processor.

13. A vision-guided alignment system to align a plurality of components comprising:
   a robotic gripper configured to move one component relative to another component;
   a camera generating an image of the components;
   a computer aided design (CAD) model of the components;
   a processor generating a computer-simulated robotic work cell from said CAD model representing a real or potential robotic work cell, wherein said processor calculates initial calibration positions that define the movement of said robotic gripper, and wherein said processor executes a camera space manipulation based algorithm to compensate position errors between actual positions of the robotic gripper and said initial calibration positions to control said robotic gripper to move one component into alignment with another component based on said image of the components; and
   said robot gripper assembles the components together at a predetermined insertion position identified by said processor using said CAD model, the insertion position comprising a viewable feature on one of the components and a not viewable feature on the other component.

14. The system of claim 13, wherein said computer-simulated robotic work cell verifies said initial calibration positions.

* * * * *